March 20, 1962 R. J. KEATING ETAL 3,025,943
ARTICLE HANDLING APPARATUS
Filed July 3, 1959 3 Sheets-Sheet 2
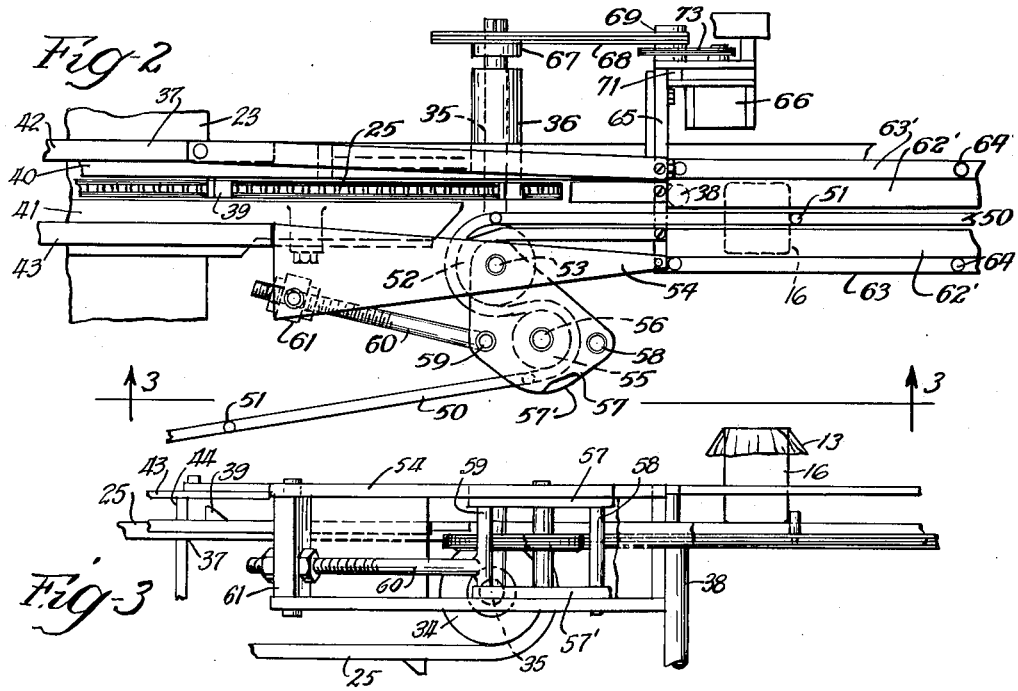
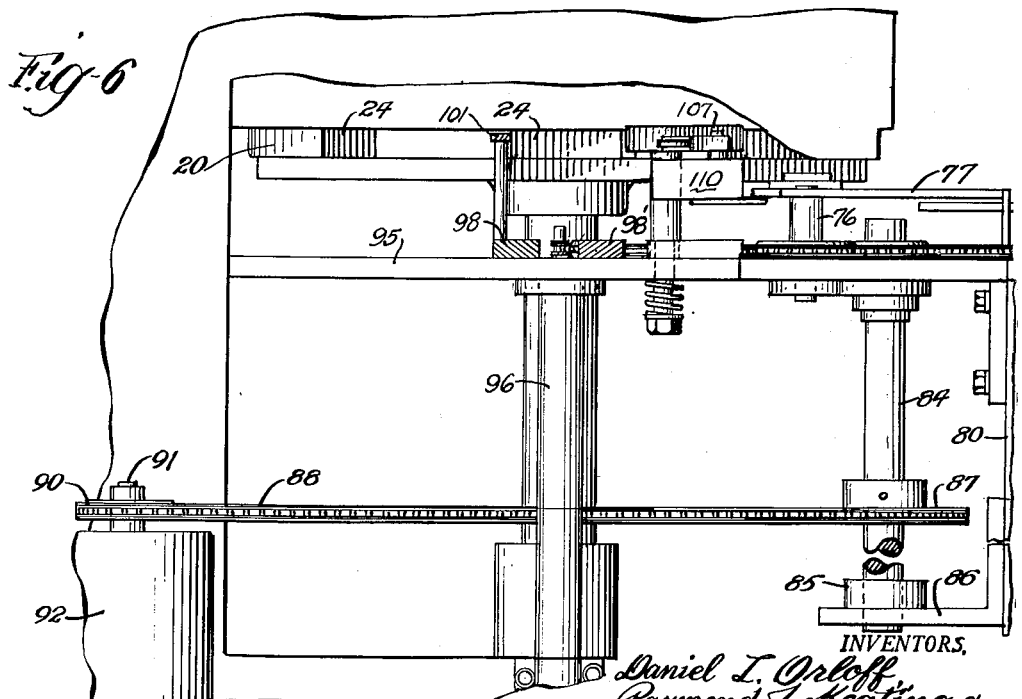
INVENTORS.
Daniel I. Orloff
Raymond J. Keating &
Harold F. Pernot
By: Cromwell, Greist & Warden Attys.

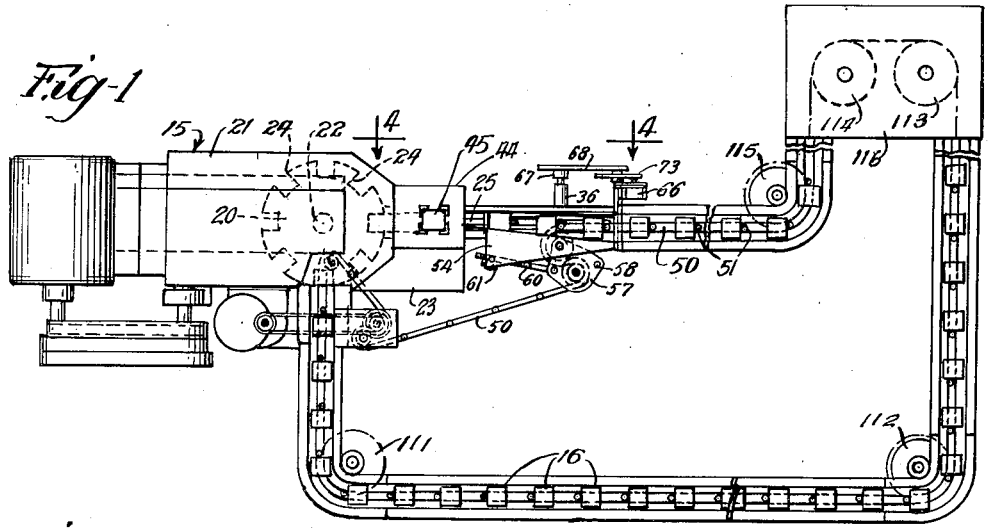

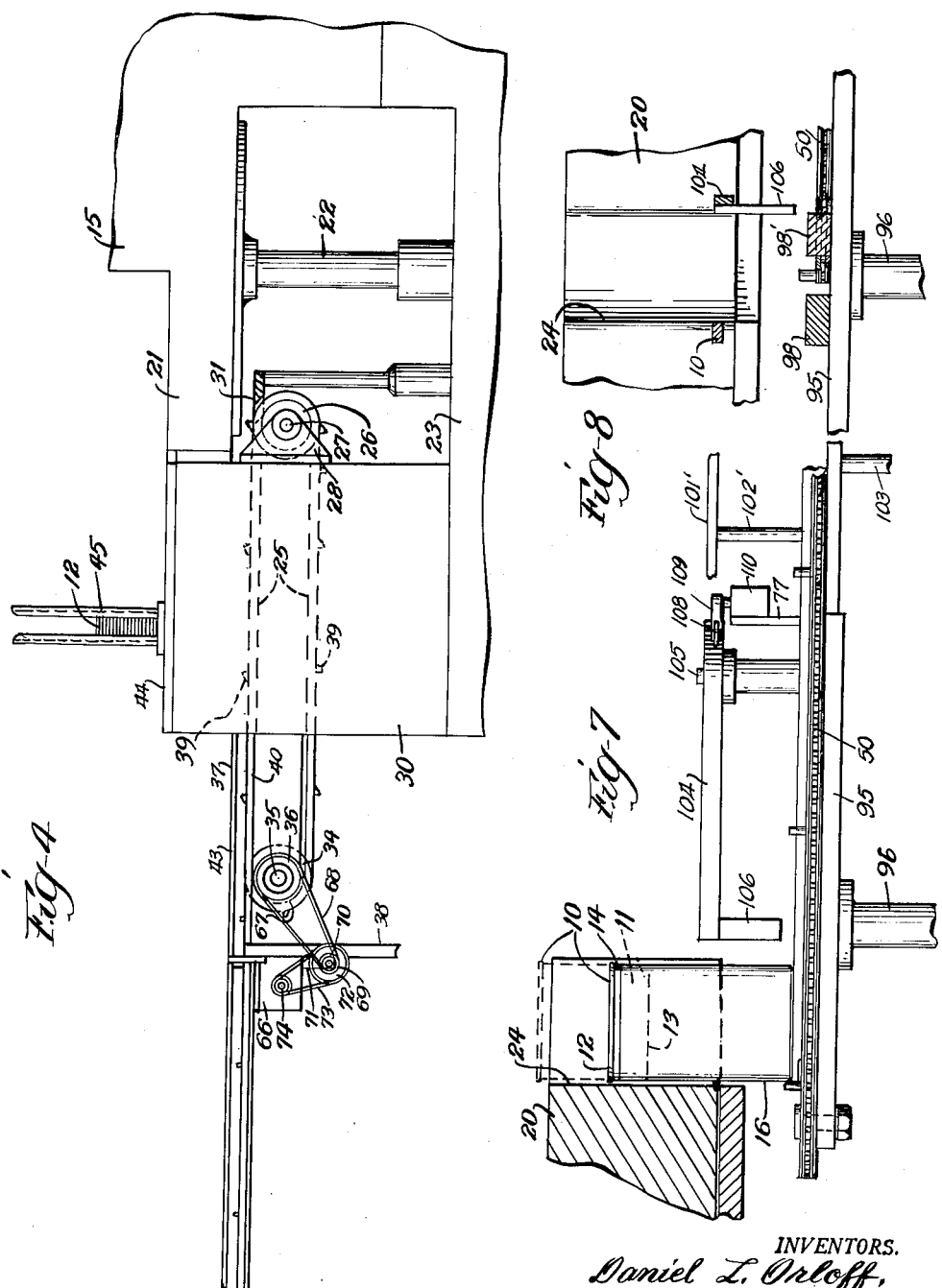

United States Patent Office 3,025,943
Patented Mar. 20, 1962

3,025,943
ARTICLE HANDLING APPARATUS
Raymond J. Keating and Daniel L. Orloff, Madison, Wis., and Harold F. Pernot, Chicago, Ill., assignors to Oscar Mayer & Co., Inc., Chicago, Ill., a corporation of Illinois
Filed July 3, 1959, Ser. No. 832,876
9 Claims. (Cl. 198—20)

This invention relates to article handling and is more particularly concerned with improvements in conveying apparatus for use with merchandise packaging or like equipment.

It is a general object of the invention to provide a conveying apparatus for feeding receptacles or containers which are to have a closure member, in the form of a can lid, applied thereto, to a can closing machine and for receiving the containers from the closing machine after the closure is applied so as to convey the same away from the machine with the conveying apparatus being connected to the drive for the closing machine so that the same is moved in synchronism with the operating elements of the machine.

It is a further object of the invention to provide a conveying apparatus for delivering successive receptacles to which a closure is to be applied to a canning machine which is characterized by a pocketed spider mounted for rotation on a vertical axis and having infeed and outfeed stations peripherally spaced about the same which conveying apparatus comprises an endless chain conveyor having receptacle engaging upstanding lugs spaced therealong, which conveyor is mounted on a series of horizontally disposed sprockets, with two of the sprockets being arranged adjacent the infeed and discharge stations of the closing machine so that the receptacles are delivered by the conveyor to the closing machine adjacent the infeed station and after the closure is applied in the machine, the receptacles are delivered directly to the conveyor for removal from the machine.

It is a more specific object of the invention to provide apparatus for use in a packaging operation in which a rigid metal closure member, in the form of a can lid, is applied by a can closing or seaming machine to a package assembly while the package assembly is supported in the end of a rigid hollow upright form which apparatus comprises an endless traveling conveyor arranged adjacent the closure applying machine and a series of the rigid hollow package supporting forms which are adapted to receive the package assemblies in their upper open ends and to be carried on the conveyor to a transfer station where they are delivered successively to the infeed apparatus of the closing machine which applies the closure member and performs the seaming operation, the form carrying conveyor being arranged at the discharge station of the closing machine to receive the forms as they are delivered from the machine with the closed packages therein and to advance the forms along a closed path to apparatus for performing further operations on the package and/or removing the completed packages from the forms, with the empty forms remaining on the conveyor in condition to receive further package assemblies for delivery to the closing machine.

These and other objects and advantages of the invention will be apparent from a consideration of the apparatus which is shown by way of illustration in the accompanying drawings wherein:

FIGURE 1 is a plan view, partially schematic, illustrating an apparatus which embodies therein the principal features of the invention;

FIGURE 2 is a fragmentary plan view, to an enlarged scale, showing a portion of the apparatus at the infeed transfer station for the closing machine;

FIGURE 3 is a side elevation of the apparatus shown in FIGURE 2;

FIGURE 4 is a partial side elevation, to an enlarged scale, the view being taken generally on the line 4—4 of FIGURE 1, with portions omitted;

FIGURE 5 is a fragmentary plan view, to an enlarged scale, showing a portion of the apparatus at the discharge station of the closing machine;

FIGURE 6 is a section taken generally on the line 6—6 of FIGURE 5;

FIGURE 7 is a cross section taken on the line 7—7 of FIGURE 5; and

FIGURE 8 is a cross section taken on the line 8—8 of FIGURE 5.

The apparatus which is illustrated in the drawings is particularly designed for use in connection with the manufacture of the food package which is disclosed in copending application Serial No. 548,093, filed November 21, 1955, now Patent No. 2,938,801, issued May 31, 1960, reference to which may be had for the details of the package and the method of forming the same. Briefly, the package 10 (FIGURE 7) comprises a product, for example, a stack of sliced bologna 11, a metal base member 12, which is in the form of a conventional can lid, on which the product is supported, and a plastic film 13 enclosing the remaining sides of the product, the margins of the film wrapper and the base member being crimp sealed to the edge of a relatively thin narrow cylindrical sealing ring 14 by a rolled seam which is adapted to be formed in a can closing machine 15 (FIGURE 1) of conventional construction. The base member 12 is applied to the wrapper 13 and the sealing ring 14 while the package is supported in an inverted position, the sealing ring 14 being first placed on the top edge of a rigid, hollow, cylindrical form 16 and the wrapper and product being inserted in the form with the margins of the wrapper draped over the upper edge of the sealing ring, and the assembly being then fed to the can closing machine which applies the closure member 12 over the exposed portion of the product and performs the closing or seaming, as in a conventional canning operation, with the closed package and its supporting form being carried through the closing machine 15 and delivered at its discharge station.

The present apparatus is designed especially to provide the necessary forms 16 for rigidly supporting the package assemblies during their passage through the closing machine and for handling the forms 16 while the package assemblies are placed therein and removed therefrom. The apparatus permits other operations on the package, as for example, the application of a label or other marking and the removal of the packages from the forms without removal of the forms from the conveyor so as to provide a continuous, uninterrupted packaging operation.

Referring to FIGURES 1, 5 and 6, of the drawings, there is illustrated a closing machine 15 which has a can or form conveying spider 20 rotatably mounted within the housing 21 on a vertical shaft 22 extending upwardly of the base 23 of the machine. The spider 20 is provided with outwardly opening peripheral pockets 24 which are adapted to receive successive cans or form and package assemblies and to move the same to the seaming station where the top of the assembly is positioned in the seaming head (not shown). The seaming head is, of course, designed to make a crimped seam of the character desired and associated apparatus is provided for elevating the assemblies and supporting the same at the seaming station so that the marginal edge or flange of the lid and the other seam forming elements are in proper position for the seam forming operation.

An infeed conveyor 25 (FIGURES 1, 2, 3 and 4) is arranged to extend in a vertical plane and in radial alignment with the upper run thereof terminating below the lower peripheral edge of the spider 20. The conveyor 25 is mounted at the machine end on a sprocket 26 carried on a transversely extending shaft 27 which is journaled in a bearing 28 secured on the edge of a vertical support plate or frame member 30 which extends upwardly of the base 23 of the machine. A vertically reciprocating platform 31 is provided in the machine, at the end of the conveyor 25, which elevates the successive package assemblies for delivery into a pocket 24 of the spider 20 as the forms 16 are delivered from the end of the conveyor 25 to the elevator 31 by a pusher arm 32 (FIGURE 5) mounted for swinging movement on a vertical shaft 33 at the other side of the conveyor 25. The conveyor 25 and the elevator 31 are connected to the main drive of the closing machine and are operated in synchronized relation with the movement of the spider 20. The conveyor 25 is supported at its outer end on a sprocket 34 (FIGURES 3 and 4) which is mounted on a cross shaft 35 journaled in a bearing bracket 36, the latter being secured beneath a supporting frame structure 37 which extends from the support plate 30 to a vertical frame post 38. The conveyor 25 has a series of form engaging fingers or lugs 39 which engage with the trailing edges of the forms and move the same along a pair of transversely spaced supporting rails 40 and 41 which are mounted on the conveyor frame structure 37 and on brackets extending from the plate 30. The rails 40 and 41 are arranged on opposite sides of the upper run of the conveyor to support the forms 16 as they are advanced to the machine. A pair of laterally spaced side guide bars 42 and 43 are supported above the frame structure 37 by means of upstanding posts 44 on the supporting rails 40 and 41 to hold the forms 16 on the support rails as they are advanced.

The support plate 30 has a horizontal platform 44 on its upper edge on which there is mounted a magazine 45 for a stack of the closure members 12 and associated feed mechanism (not shown) for delivering a closure 12 to the package assembly in each successive form 16 as the forms are advanced successively into the pockets 24 of the spider 20 from the conveyor 25.

The forms 16 are delivered to the infeed conveyor 25 of the closing machine 15 from an endless chain conveyor 50 which is mounted for travel in a horizontal plane and which has longitudinally spaced upstanding lugs or fingers 51 which engage with the trailing sides of the forms 16. The conveyor 50 is supported on a series of sprockets which rotate on vertical shafts and which are arranged to carry the conveyor along a predetermined horizontal path.

The forms 16 are each provided with a package assembly as they approach a transfer point (FIGURES 2 and 3) at the receiving end of the infeed conveyor 25 of the closing machine. At this point the conveyor 50 is supported on a horizontal sprocket 52 which is carried on a vertical shaft 53 journaled in suitable bearings in the top and bottom walls or flanges of a channel-shaped bracket 54 which is secured in outwardly facing relation on the side of the conveyor frame structure 37. The axis of rotation of the vertical shaft 53 and the axis of rotation of the horizontal shaft 35 are in a common transverse plane with the shaft 53 offset relative to the vertical plane of the conveyor 25 and its end supporting sprocket 34. The conveyor chain 50 is carried around the sprocket 52 and then around a tensioning or take-up idler sprocket 55 which is mounted on the vertical shaft 56, the latter being journaled in the vertically spaced plates 57 and 57' which form a housing of generally triangular shape. The two plates 57 and 57' are held in spaced relation by a separator bolt or pin 58 at one corner and the housing is pivoted at another corner on the shaft 53 in the bracket 54. The sprocket housing carries a vertically disposed pivot pin 59 at the end of a horizontally disposed brace rod 60 and the threaded end of the latter passes through an aperture in a vertical pivot post 61 which is secured between the vertically spaced flanges of the support bracket 54 and is provided with adjusting nuts so as to permit the housing to be swung to adjust the tension in the chain 50. The conveyor chain 50 approaches the sprocket 52 between form supporting rails or plates 62 and 62' which have side guide rails 63 and 63' mounted thereon in vertically spaced relation by means of vertical posts 64 and 64'. The upwardly opening trough or frame thus formed is supported at the transfer point on the cross member 65 and the vertical post 38 at the end of the frame structure 37. The form supporting and guiding rails 62, 62' and 63, 63' are aligned with the corresponding members for the conveyor 25 so that when the form engaging lugs 51 advance around the sprocket 52 they move out of engagement with the forms, leaving the latter in the path of the lugs 39 of the conveyor 25 as the lugs 39 advance upwardly around the end sprocket 34. The lugs 39, of course, advance the forms toward the infeed station.

A safety switch 66 (FIGURES 2 and 5) is located at the transfer point to prevent piling up of the forms 16 in the event anything occurs to slow down or stop the infeed conveyor 25. The switch 66 is in a housing which is mounted on the cross frame member 65 and is operated by the shaft 35. The shaft 35 is extended to receive a sprocket 67 which is connected by a drive chain 68 with a sprocket 69 on a shaft 70 which is supported below the switch 66 on the depending bracket 71. The shaft 70 carries a sprocket 72 which is connected by a chain 73 with a switch operating sprocket 74. The switch 66 is the type which is actuated in response to changes in the speed of operation of the sprocket 74 and is connected into an electrical control circuit (not shown) so that when the conveyor 25 slows down or stops the switch 66 operates to stop the conveyor 50.

The conveyor chain 50 advances from the tensioning sprocket 55 on a diagonal path to the outfeed station (FIGURES 5 to 8) of the closing machine which is 90 degrees from the infeed station or 270 degrees in the direction of travel of the spider 20, where it is supported on a small idler sprocket 75 which is carried on the vertical shaft 76 journaled in a sprocket housing 77. The housing 77 is secured at the upper end of an upright post 80 which is connected at its bottom end to the bracket 81 extending from the side wall of the base 23 of the closing machine. The post 80 also supports the end of a guard member 82 for the diagonal run of the chain 50, the other end of the guard being secured on the bracket 54. The chain 50 passes from the idler sprocket 75 around the drive sprocket 83 which is located in the housing 77 on the upper end of a vertical drive shaft 84. The drive shaft 84 is supported at its lower end in a bearing 85 on the horizontally extending leg of an angle bracket 86 which is secured to the vertical post 80. The drive shaft 84 carries a bottom sprocket 87 which is connected by a drive chain 88 with a sprocket 90 on a driven shaft 91 which projects from a gear box 92. The gear box 92 is secured to the base 23 of the closing machine and has a drive connection with the main power drive of the closing machine. It also is provided with a slip clutch on shaft 91 which is normally engaged and which is connected by a microswitch with the electrical circuit so that when any jamming occurs on chain conveyor 50 at any point the clutch is disengaged and the switch operates to stop the machine. The shaft 91 in the gear box 92, being operatively connected to the main drive of the closing machine, permits operation of the conveyor chain 50 in accurately timed relation with the operation of the spider 20 in the closing machine.

The chain 50 runs from the drive sprocket 83 to a sprocket 93 which is mounted on the vertical shaft 94 journaled at the inner end of the discharge table 95 of the closing machine. The discharge table 95 is spaced a short distance below the path of the spider 20 and extends outwardly at the discharge side of the machine. It is supported on the machine primarily by an upright post 96 which is secured at its base to the side wall of the base 23 of the closing machine. The discharge plate supports at its inner corner the vertical shaft 33 on which the feed arm 32 is mounted, the shaft 33 being journaled at its lower end in a bracket 97 on the side wall of the base 23 of the machine. The conveyor chain 50 is mounted so that it advances from the sprocket 93 outwardly of the machine in a path which coincides with the radius of the spider 20 and extends through the center of a pocket 24 when it is stopped at the discharge station for release of a form with a completely closed package therein. The form is released from the pocket 24 of the spider 20 and drops directly onto the conveyor chain 50 where it is engaged by an oncoming lug 51 and carried out of the spider pocket 24. The chain 50 is carried on the top of the discharge table 95 between a pair of parallel spaced plates 98 and 98' on which each form is supported as successive forms are discharged from the spider 20 and advanced by the conveyor lugs 51. At the outer edge of the table 95 the chain moves onto a framework which comprises the laterally spaced bottom supporting plates 100 and 100' and side guide rails 101 and 101' spaced above the same and supported on upright posts indicated at 102 and 102'. The bottom supporting plates 100 and 100' are aligned with the form supporting plates 98 and 98'. The one side guide rail 101 terminates at a point adjacent the periphery of the spider 20 while the opposite side guide rail 101' terminates adjacent the outer edge of the discharge table 95 to allow for a safety device in the event jamming occurs at the discharge station. The framework formed by the support plates 100, 100' and guide plates 101, 101' is supported on suitable posts 103.

The safety device comprises an arm member 104 mounted on a vertical pivot 105 which projects upwardly of the table 95 so that the arm 104 and its depending end member 106 are swingable in a horizontal plane. The arm member 104 has a curved tail section 107 which swings with the arm and forms an operating cam engaging with a roller 108 on the end of switch arm 109, the latter being on the top of the switch 110 which is mounted on the side of the housing 77. Any jamming or pushing of the forms 16 out of line by the operation of the spider 20 will swing the arm 104 so as to operate the switch 110 which is connected into the electrical circuit so that when it is operated the whole machine is stopped.

The conveyor 50, as shown, is supported for travel in a path or line extending some distance from the closing machine on a suitable supporting framework which includes sprockets 111 to 115, inclusive, so as to carry the forms 16 from the discharge station and through any further processing apparatus (not shown), which may be desired, to apparatus for removing the completed packages from the forms 15, as indicated at 116. A suitable package removing apparatus is disclosed in Kohrs et al. Patent No. 2,860,763. After the packages are removed from the forms 16 the latter are advanced toward the transfer point and a new package assembly is placed in each form 16 for delivery to the infeed side of the closing machine.

The apparatus as illustrated is particularly adapted for use in the manufacture of the package referred to but it is not limited to such use since it may be employed in the handling of cans or other articles which may be processed in a closing machine of the type described.

While specific materials and particular details of construction have been referred to in describing the illustrated form of the apparatus, it will be understood that other materials and equivalent structural details may be resorted to within the spirit of the invention.

We claim:

1. A conveying apparatus for feeding a series of open top containers to a can closing machine and for delivering the same therefrom after the top is closed, said closing machine being characterized by a pocketed spider mounted for rotation on a vertical axis with infeed and discharge stations at circumferentially spaced points on the path of the spider and a relatively short infeed conveyor mounted for operation in a vertical plane and having spaced lugs on an upper run thereof for delivering the containers to the spider at the infeed station, said conveying apparatus comprising an endless chain conveyor supported on a plurality of horizontal sprockets for movement in a horizontal plane, said chain conveyor having upstanding fingers spaced along the same for engaging with the trailing sides of the containers, said chain conveyor having one of its supporting sprockets arranged at the receiving end of said infeed conveyor so that containers carried thereon are advanced onto the infeed conveyor and into the path of the lugs on the infeed conveyor, and having another of its supporting sprockets arranged beneath said spider with the conveyor traversing a radial path outwardly thereof at the discharge station and with the intermediate portion thereof which extends between the aforementioned sprockets bypassing the closing machine, and means to connect the drive for said conveyor to the drive for the closing machine so as to synchronize the movement of the conveying apparatus with the movement of the pocketed spider of said closing machine.

2. A conveying apparatus for feeding successive open top packaging forms to a top closing machine and for receiving the forms therefrom after the top is closed, said top closing machine being characterized by a pocketed spider rotatably mounted on its vertical axis with peripherally spaced infeed and outfeed stations and an infeed conveyor mounted to operate in a vertical plane with form engaging lugs spaced along the same and with the upper run thereof adapted to deliver forms received thereon to the spider at the infeed station, said conveying apparatus comprising an endless chain supported on a series of horizontal sprockets, said chain having upstanding form engaging lugs spaced longitudinally of the same and a series of package forms adapted to be carried on said chain conveyor and to be passed through said top closing machine, one of the chain supporting sprockets being positioned adjacent the receiving end of the infeed conveyor so that the chain approaches said sprocket along a path which is generally parallel with and closely approaches the path of the upper run of said infeed conveyor for cooperation with said conveyor to provide automatic transfer of the forms from the chain conveyor to the infeed conveyor, another of the chain supporting sprockets being positioned beneath the spider so that the chain conveyor advances outwardly in a radial path from beneath the spider and receives directly the forms discharged from the spider, and means for connecting the driving means for said chain with the drive means for said spider and said infeed conveyor so that said chain is driven in synchronism with the movement of said spider and said infeed conveyor.

3. An apparatus for conveying package supporting forms to a machine for applying can top type closures to package assemblies placed in the forms and for receiving the forms therefrom after the top is closed, said machine being characterized by a pocketed spider which is rotatably mounted on a vertical axis and peripherally spaced infeed and outfeed stations, said conveying apparatus comprising an endless conveyor carried on a series of rotatable support members which are mounted on vertical axes so that the conveyor traverses a path in a horizontal plane, said conveyor having upstanding form engaging lugs spaced longitudinally of the same, the conveyor support members being located so that the conveyor has a run adjacent the infeed station of the spider which is in a radial path toward the spider and which delivers the forms to the machine and said conveyor having another run extending outwardly from a point beneath the spider in a radial direction at the outfeed station so as to receive the forms when they are discharged from the spider, and means for connecting said conveyor with the drive means for said spider so that said conveyor is driven in synchronism with the movement of said spider.

4. An apparatus for supplying open top package assemblies to a top closing machine, said closing machine being characterized by a pocketed spider rotatably mounted on a vertical axis and means for imparting intermittent movement to the spider so as to align pockets therein at peripherally spaced infeed and outfeed stations, said apparatus comprising a series of hollow upwardly opening rigid forms adapted to support package assemblies in the tops thereof and an endless traveling chain conveyor for said forms which is mounted to advance along a path having a portion thereof which is aligned with a radially extending infeed device for the closing machine so as to transfer successive forms to said infeed device for delivery to pockets in the spider and having another portion of said path extending radially in an outward direction beneath the spider at the outfeed station so as to receive forms discharged from the pockets in the spider, and means connecting said traveling conveyor with the movement imparting means for said spider so that said traveling conveyor is advanced in timed relation to the movement of said spider.

5. An apparatus for conveying open top package assemblies to a can top closing machine and delivering the closed packages therefrom, said closing machine being characterized by a turret having peripherally spaced pockets and rotatably mounted on a vertical shaft which is connected to power means for imparting intermittent movement thereto so as to align pockets therein at peripherally spaced infeed and outfeed stations with the infeed station having an infeed conveyor device connected to said power means for operation in synchronism with said turret, said apparatus comprising a series of rigid forms adapted to support package assemblies in the tops thereof and an endless traveling conveyor for carrying said forms in an upright position and in a horizontal plane said conveyor being mounted to advance along a path having a portion extending radially toward said turret which adjoins said infeed device for the closing machine so as to deliver successive forms to said infeed device for movement into pockets in the turret and having another portion of said path extending from beneath said turret in an outward direction at the outfeed station so as to receive forms discharged from the pockets in the turret at said outfeed station, and means connecting said traveling conveyor with the power means for said turret so that said traveling conveyor is operated in synchronized relation with the movement of said turret.

6. An apparatus as recited in claim 5 and a switch having its operating arm mounted alongside said traveling conveyor at the outfeed station, said switch being connected to said power means and being operable to stop the movement of said turret upon jamming of the forms at the infeed station.

7. A conveying apparatus for feeding a series of open top containers to a can closing machine and for delivering the same therefrom after the top is closed, said closing machine being characterized by a pocketed turret mounted for rotation on a vertical axis with infeed and discharge stations at circumferentially spaced points and a relatively short infeed conveyor mounted for operation in a vertical plane and having spaced lugs for delivering the containers to the turret at the infeed station, said conveying apparatus comprising an endless chain conveyor supported on a plurality of horizontal sprockets for movement in a horizontal plane, said chain conveyor having upstanding fingers spaced along the same for engaging with the trailing sides of the containers, said chain conveyor having one of its supporting sprockets arranged at the receiving end of said infeed conveyor so that containers carried thereon are advanced into the path of the lugs on the infeed conveyor and having another of its supporting sprockets arranged beneath the discharge station so that the conveyor receives containers discharged from the turret at the discharge station, said conveyor having an intermediate portion thereof extending between the infeed and discharge stations which moves around the closing machine, and means to connect the drive for said conveyor to the drive for the closing machine so as to synchronize the movement of the conveying apparatus with the movement of the pocketed turret of said closing machine.

8. A conveying apparatus for feeding successive package carrying forms to a top closing machine and for receiving the forms therefrom after the top is closed, said top closing machine having a pocketed spider rotatably mounted for movement on a vertical axis and peripherally spaced infeed and outfeed stations with a vertically disposed endless infeed conveyor at the infeed station, said spider and said infeed conveyor being driven by a common power means, said conveying apparatus comprising an endless chain conveyor supported on a series of horizontally disposed sprockets which are spaced so as to carry the chain in a predetermined horizontal path, said chain having upstanding form engaging lugs spaced longitudinally of the same, one of the sprockets on which said conveyor chain is carried being mounted to bring the conveyor chain to a point adjacent the infeed conveyor so that successive forms on the conveyor chain will be moved onto the infeed conveyor for delivery to the pockets in the spider, another of said sprockets being mounted beneath the outfeed station so that forms discharged from the spider will be deposited onto the conveyor chain, and means for connecting said conveyor chain with the power drive means for said spider and infeed conveyor so that said conveyor chain is driven in synchronism with the movement of said spider and infeed conveyor.

9. A conveying apparatus as recited in claim 8 and a safety switch device connected between said power means and said conveyor chain which is operative in response to changes in speed of said infeed conveyor to stop the movement of said conveyor chain.

References Cited in the file of this patent
UNITED STATES PATENTS
1,171,339 Hoskins et al. _____ Feb. 8, 1916